Aug. 16, 1955  W. J. ROZMUS  2,715,345
ARTICULATED ACTUATION DEVICE ASSOCIATED
WITH SHIFTABLE CARRIAGES
Filed March 24, 1954  2 Sheets-Sheet 1

INVENTOR.
Walter J Rozmus
BY Ray S Pyle
atty

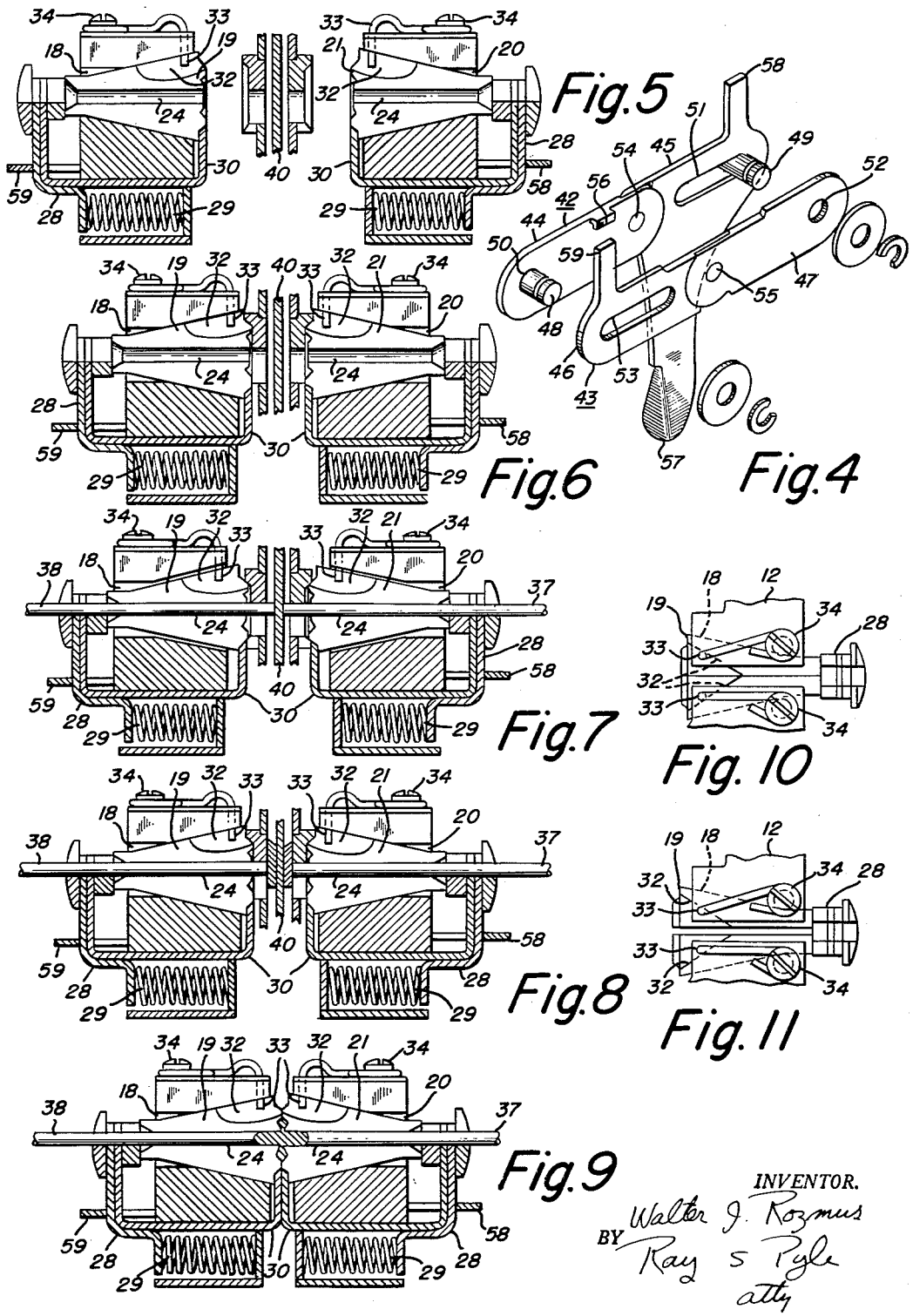

United States Patent Office 2,715,345
Patented Aug. 16, 1955

2,715,345

ARTICULATED ACTUATION DEVICE ASSOCIATED WITH SHIFTABLE CARRIAGES

Walter J. Rozmus, Whitesboro, N. Y., assignor to Utica Drop Forge & Tool Corporation Application March 24, 1954, Serial No. 418,367

5 Claims. (Cl. 78—82)

This invention relates to tools in general, especially hand tools, and relates more specifically to an auxiliary actuation device carried with movable work-performing carriage jaws, the actuation device providing an instrumentality for powering tooling carried by the jaws.

As an illustration of one particular device adapted for use of the present invention, a butt weld tool employed for the coldwelding of wires by high pressure and confined flow has been selected. Many tools have been made for special purposes, and undoubtedly will be created in the future, wherein two or more main drive carriages carry dies or other tooling which must be actuated during the work cycle relative to the main carriages for auxiliary operations such as loading of the dies with workpieces. Efficient actuation of the tool becomes equally as important as the proper drive of the tooling by the main carriages. The auxiliary actuation and implementation of the tool in a convenient and useful manner is the basis of the present invention.

An object of this invention is to provide a tool having work-performing jaws moveable with respect to one another along a path, and to provide an auxiliary actuation device moveable correspondingly and actuatable to move tooling carried by said jaws.

Another object of this invention is to have the auxiliary device maintain a fixed relative position with respect to the work jaws as the work jaws move to thereby maintain a fixed relative moveability for actuating the tooling carried by the jaws.

Still another object of this invention is to provide a mechanical device having power take-off stations relatively shiftable by a first drive power source and having the power take-off station implemented to deliver actuating power by a second driven power source.

And another object of this invention is to produce a double acting closure of two opposed power members by a single swingable lever handle.

Other objects and a fuller understanding of the invention may be had by referring to the following description and claims, taken in conjunction with the accompanying drawings, in which:

Figure 4 is an exploded view of the auxiliary articulated actuation device separate from the particular illustrative tool;

Figure 5 is the first in a series of operational illustrations of the cone dies of the particular butt weld tool employed to illustrate this invention, the section being as taken along line 5—5 of Figure 2 and the parts being in the initial position prior to loading with workpieces;

Figure 6 illustrates the closing of the dies upon a conditioning and preparation device to cause relative alignment of the dies and preparation device prior to loading the tool with workpieces;

Figure 7 illustrates the slight backing-off position of the carriages and the dies advanced with respect to their sockets by the actuating device of Figure 4 to open the dies and to maintain interconnection of the dies with the conditioning and preparation device;

Figure 8 illustrates the loaded dies and the conditioning and preparation devices fully engaged with the cutting member of the preparation devices just past the workpiece cut-off position;

Figure 9 illustrates the final position of the dies after the conditioning and preparation tool has been removed and the dies closed in producing the union of the workpieces;

Figure 10 is a top view of the split cone dies as seated in their respective sockets; and Figure 11 is the same top view with the cone dies advanced with respect to their sockets and opened to provide lateral access into and out of the dies.

Figure 1:
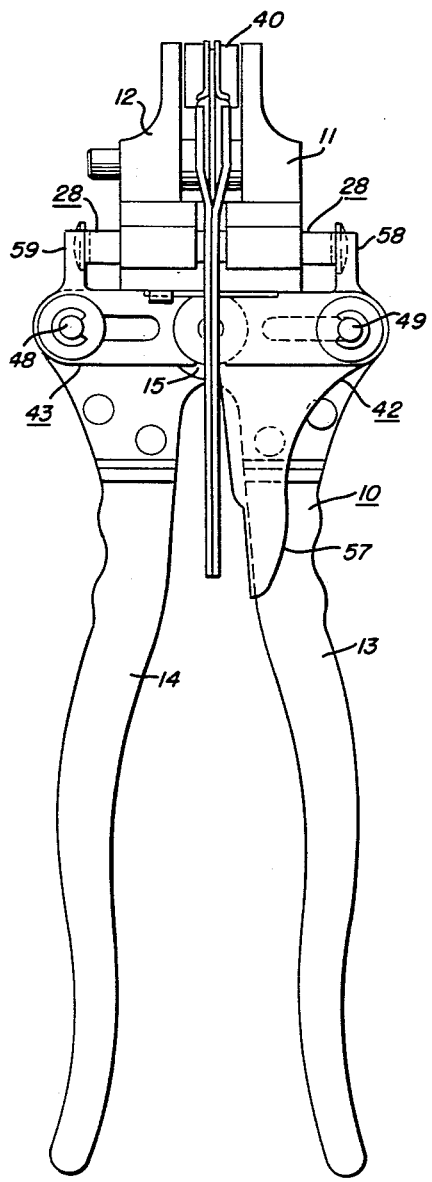
Figure 1 is a front elevational view of a tool having two movable carriages operable in a path for carrying dies adapted for butt-welding workpieces by confining flow of metal under high pressure, the dies being split and shiftable in their sockets by an auxiliary actuating device for splitting the dies to insert and remove workpieces.

This invention can be applied to many different types of tools, but for the purpose of illustrating a specific embodiment of a tool to which this invention can be applied, it is set forth in connection with a tool for uniting workpieces by holding two workpieces in proper relative position and confined to a predetermined flow while applying a work force causing the workpieces to impinge under high pressure and flow together into a united structure. The type of union illustrated is a butt-weld, as distinguished from the union of workpieces in side by side or crossed relationship. The illustrated tool 10 is adapted primarily for joining of wires and can readily be adapted for other common buttweld operations.

The tool 10 in the illustrated embodiment consists generally of two carriages 11 and 12 driven toward and away from one another through a fixed work cycle path by means of handles 13 and 14 operating through a linkage 15. The linkage 15 may be any suitable toggle linkage mechanism adapted to provide little movement but extremely high pressure at the end of the work cycle stroke, thus producing the required extreme pressure necessary for the cold butt welding of the workpieces.

In the illustrated tool 10, used for buttwelding of two longitudinal wires in end-to-end relationship, the dies and cooperating apparatus in each of the carriages 11 and 12 are substantially identical. As better illustrated in the Figures 5 through 9, the carriage 11 is provided with a conical cavity 20 and the carriage 12 with cavity 18. A conical split die 19 resides within the cavity 18 and split die 21 in the cavity 20.

The split dies are adapted to be wedged into the cavities and thereby grip a workpiece by contraction of the die sections. A workpiece holding cavity 24 extends longitudinally along the axis of each die, a portion of the cavity 24 being formed in each of the sections in the split die. Cavity 24 is made slightly smaller than the workpiece to be held by the die and, consequently, wedging of the conically formed dies into the conically formed cavities will cause the dies to grip down upon the workpiece and hold the workpiece with a grip which becomes tighter as the pressure is increased. However, the taper of the dies and the cavities is above that which will form a wedging action to lock the dies in the cavities and resist release of the workpiece.

Workpieces may be inserted into the dies from the rear once the dies are loosened from the cavities, but the flash which is formed in making the weld, and quite often the length of the workpiece, prevents removal along the same route. Therefore, the dies are split to permit the dies to part and the workpiece to be removed laterally.

A conditioning and preparation device 40, illustrated in full only in Figure 1 of the drawing, a fragment of which is shown in Figures 5 through 9, is a tool provided for for trimming the ends of the workpieces to a precise extension of the workpiece from its holding die. Also, device 40 squares the end of the workpiece and otherwise conditions the workpiece for producing the best possible conditions suitable for producing a butt-weld. Device 40 has suitable receptacles to receive the face ends of dies 20 and 21 for properly locating the dies with respect to the device 40.

The dies are each adapted to open, or split, when moved forward in their respective cavities. Each die is provided with cam surfaces 32 which extends at an angle to the longitudinal axis thereof. Cams 33, shown in the preferred embodiment as wire fingers, are held on the surface of the carriages by means of screws 34, and extend down between the split dies to contact the cam surfaces 32. When the split dies are retracted within the cavities and thereby closed upon a workpiece, the cams 33 contact the cam surfaces 32 near the front of the dies at the widest portion of the cam track defined by surfaces 32. Therefore, any forward movement of the split dies will cause the cam surfaces 32 to force the sections of the split dies apart as they tend to move past the cams 33.

The fragmentary illustrations in Figures 10 and 11 are provided to more clearly show the cam opening action provided by surfaces 32 and cams 33.

In order to actuate the dies relative to the cams to open the dies for removal of workpieces and to facilitate the insertion of workpieces into the dies, die carriages 28 and U frames 30 are provided to contact both the front and back end of the dies. A spring 29 in each die carriage urges the frame 30 to a holding position wherein the die is snug in its cavity as illustrated in Figure 5. Means may then be provided to actuate frame 30. As the frame 30 moves forward, the die associated therewith is moved out of the cavity, as illustrated in Figure 7, to release the grip upon the workpiece.

In order to properly locate the workpieces, the conditioning and preparation device, and the dies, the dies should be parted a slight amount with the face ends of the dies engaged with the conditioning and preparation device 40. Thus, the workpieces may be forced through the split dies and into the device 40. By placing a pressure on the frame 30 in opposition to the pressure of spring 29, the device 40 and dies 19 and 21 can be held snugly engaged while the operator inserts the workpieces, and thereafter, the handles 13 and 14 may be actuated to close the carriages 11 and 12 and set the dies into their respective sockets while maintaining the dies and the preparation device 40 in proper alignment. Thus, there is assurance that the workpieces are fully extended into the device 40 for preparation.

It can readily be seen that the operation of the handles 13 and 14, the maintenance of a pressure upon the dies 19 and 21 against the urge of springs 29, and the insertion of the workpieces through the dies 19 and 21, would require considerable dexterity and practice to do all of the operations simultaneously and correctly.

Figure 2:
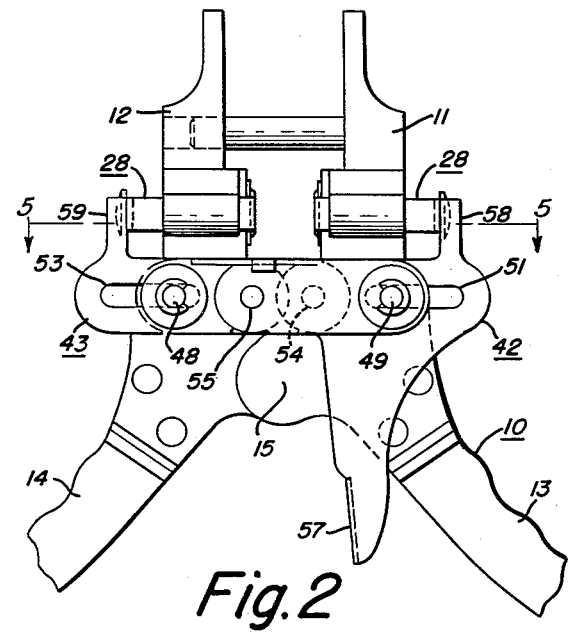
Figure 2 is an illustration of the head portion of the tool with the carriages and dies opened for loading and preparation of workpieces.
Figure 3:
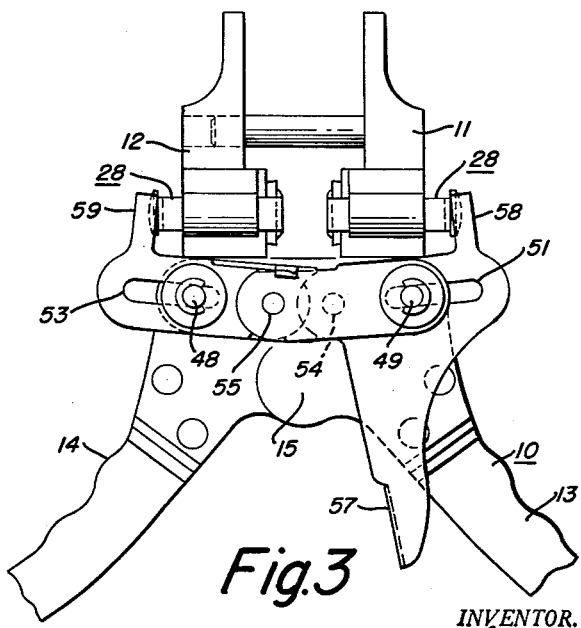
Figure 3 is a view similar to Figure 2 with the auxiliary die actuating mechanism implemented to advance the split dies in their sockets.

However, the operator is able to maintain the desired forward pressure upon the dies 19 and 21 through the carriages 28 while maintaining a snug pressure upon the handles 13 and 14, by the provision of this invention. Articulated units 42 and 43 are provided as the preferred embodiment of the invention. As incorporated herein, they operate as a unit to press upon the carriages 28 and are actuated by a remote force applied to a handle lever 57 extending to a convenient position between handles 13 and 14 as illustrated in Figures 2 and 3.

It is necessary, under various conditions, to actuate the dies 19 and 21 with respect to their carriages 11 and 12 at various positions of the carriages 11 and 12. Accordingly, the articulated units 42 and 43 are adapted to maintain a relative position with respect to carriages 11 and 12, and are adapted to deliver substantially the same identical actuating movement by the same lever movement regardless of position of the carriages 11 and 12.

The construction of the articulated units 42 and 43 may be better understood by reference to the Figure 4. In Figure 4 there is illustrated a link 44 and a link 45 joined by a pivot pin 54 in end-to-end relationship. Similar links 46 and 47 are likewise joined in end-to-end relationship by a pivot pin 55.

In the tool 10 there are two pins 48 and 49 in the linkage 15 which connect the linkage 15 to the respective carriages 11 and 12. Consequently, pins 48 and 49 have a movement substantially identical to the movement imparted to carriages 11 and 12.

Link 44 is provided with hole 50 to provide swingability of link 44 upon pin 48 but prevent relative longitudinal movement with respect to the pin 48. Link 45 is provided with a longitudinal slot 51 and may, therefore, slide relative to pin 49 when mounted thereon. Thus, articulated unit 42 will move with the pin 48, which controls carriage 11. A finger 58 on link 45 is thereby carried through the identical cycle of movement with the carriages 11 and maintains such relative position at all times.

On the other hand, link 47 is provided with a hole 52 to accept pin 49 whereas the link 46 is provided with a slot 53 to accept and slide upon pin 48. Thus, articulated unit 43 will move with the pin 49 and will slide over the pin 48 as a guide. Finger 59 on link 46 is thereby maintained in a fixed relative position with respect to carriage 12, because carriage 12 is operated through pin 49, and will have substantially the identical work cycle movement as that provided for carriage 12.

Although the articulated units 42 and 43 could be provided at separate positions on the tool 10, it is desirable to employ the two units 42 and 43 as a single cooperating couple and, accordingly, they are mounted on one side of the tool as illustrated in Figure 1. Thus, only one actuating handle lever 57 is required for both units 42 and 43 by providing an interconnecting drive link from the unit 42 to the unit 43. Such linkage is conveniently provided by the use of a tab 56 on the link 44 to hook over the top of link 46. Fingers 58 and 59 extend to contact the back portion of the die carriages 28 and, accordingly, are urged apart by the springs 29. Thus, when the handle 57 is actuated, the articulated units will tend to shorten longitudinally and pull the fingers 58 and 59 toward one another. If the pins 48 and 49 are closer than for normal closed rest position as shown in Figure 1, the articulated units are able to pivot and bring the fingers 58 and 59 together. However, when pins 48 and 49 are fully parted as in the Figure 1, the articulated units are immobilized.

Whenever the articulated units begin to foreshorten, they will cause a compression action upon the spring 29 and they will advance the U frames 30 to open the dies 19 and 21. Upon release of pressure from the handle 57, the springs 29 will return the dies to their original position and will force the fingers 58 and 59 apart and return the articulated units to their rest position.

Reference to Figures 5 through 9 will better illustrate the operation of the tool 10, the conditioning and preparation device 40, and the articulated units 42 and 43.

In Figure 5, the carriages and dies are illustrated in the open position with the device 40 positioned between the dies. In the Figures 5 through 9, only a fragmentary portion of the device 40 is illustrated.

The first step in the operation of the tool 10 is to close the carriages 11 and 12 upon the device 40 by actuating the handles 13 and 14. Thus, as illustrated in Figure 6, the split dies and the device 40 are brought into perfect inter-engaged alignment.

After having been brought into engagement, as illustrated in Figure 6, the carriages 11 and 12 are backed off a very slight amount, but not sufficient to disengage the dies from the device 40. This condition is illustrated in Figure 7. The slight amount of back-off, however, will permit the split dies to be moved forward with respect to the particular cavities 18 and 20 and thus may be opened slightly by the co-action of the cams 33 and cam surfaces 32 as the dies are advanced in their cavities. Thus, the workpiece holding cavities 24 are opened a sufficient amount to receive workpiece wires 37 and 38. Because of the slight amount which the split dies are opened in Figure 7, the wires 37 and 38 are inserted through the backs of the split dies.

At the stage illustrated in Figure 7, the articulated units 42 and 43 play an important role. A firm pressure on the dies 19 and 21 must be maintained in order to hold the dies engaged with the device 40, and the handles 13 and 14 must be held in substantially the illustrated relative position in order to allow the split dies to firmly engage the device 40 without opening wider than desired. With the handles held in the proper location, the operator can readily engage the handle lever 57 with only one hand while steadying the tool 10 and cause the articulated units 42 and 43 to advance the dies as illustrated in Figure 7.

After the wires 37 and 38 are inserted into the split dies as illustrated in Figure 7, the handles 13 and 14 are again actuated to close the carriages and drive the faces of the dies into seated engagement with the device 40. This action not only re-aligns the device 40 with respect to the longitudinal axis of the split dies, but also drives the split dies into their respective holding cavities and causes the dies to close upon the workpieces in a holding and gripping action. With the pressure maintained by the handles 13 and 14 to hold the parts tightly enmeshed, the device 40 is actuated to shear the ends of the workpieces to a proper projection with respect to the face of the dies, and to prepare the ends of the workpieces suitable for union by a cold flow of metal.

After the workpieces have been sheared and otherwise prepared by the device 40, the handles 13 and 14 are opened and the device 40 is removed from between the dies. There is no force tending to move the dies out of their respective cavities and, accordingly, the pressure inserted upon the dies during preparation and conditioning of the workpieces is sufficient to maintain the working grip on the workpieces. Thereafter, the handles 13 and 14 are again moved to close the carriages and force the butt ends of the workpieces together under an extremely high pressure condition as provided by the linkage mechanism 15 and confinement of flow provided by the faces of the split dies. The completed weld is illustrated in Figure 9 of the drawings.

After the weld is completed, as illustrated in Figure 9, the handles 13 and 14 are actuated to move the carriages 11 and 12 apart, whereupon the lever 57 of the articulated units is actuated to advance and separate the segments of the split dies. Thus, the united workpieces may be lifted laterally from the dies and removed from the tool 10.

The construction and operation of the articulated units 42 and 43 has been set forth in a particular environment where it was found to be ideally suited. It is to be understood that the device also may have similar utility in other tools wherein moveable carriages carry tooling which must be actuated with respect to the carriages during the work cycle.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A tool having first and second carriages relatively movable with respect to one another along a path, first and second drive handle members, a toggle drive system interconnecting said first and second handle members with said first and second carriage members respectively to convert pivotal movement of said handle members into movement of said carriages along said path, said toggle drive system including first and second pivot pins having a relative movement substantially identical to the relative movements of said first and second carriage members, first and second articulated actuation units, said first unit having a first and second link pivotally joined in end-to-end relationship, said first link having a hole fitted over said first pivot pin, said second link having an elongated slot fitted over the second pivot pin, an actuation lever carried by one of said first and second links, said second unit having a third and fourth link pivotally joined in end-to-end relationship, said fourth link having a hole fitted over the second pivot pin, mechanical interconnection means between said first and second units transferring drive movement from said first unit to said second unit upon actuation of the actuation handle of the first unit, and extension finger means from each unit to power the movement of fixtures carried by said first and second carriages.

2. A tool for uniting workpieces by a solid phase bond at temperatures less than normal welding temperature of the workpieces, comprising, first and second carriage means, drive means for moving said first and second carriage means through a work cycle path toward one another, each said carriage means having a forward end with a tapered cavity opening into the carriage means from said forward end, a first split tapered die residing in said tapered cavity of the first carriage, a second split tapered die residing in said tapered cavity of the second carriage, each split die having a longitudinal workpiece holding cavity adapted to grip a workpiece by squeezing action as the tapered die is pressed into the tapered cavity and released the workpiece by movement of the split die out of the tapered cavity, first and second articulated actuation units, said first unit having a first and second link pivotally joined in end-to-end relationship, first means pivotally carrying said first link in a movement corresponding to the first carriage means, said second unit having a third and fourth link pivotally joined in end-to-end relationship, second means pivotally carrying said fourth link in a movement corresponding to the second carriage means, said first means slidably guiding said third link as it moves with the second means, said second means slidably guiding said second link as it moves with the first means, mechanical interconection means between said first and second units causing said units to articulate in unison, handle lever means for pivotally swinging at least one of the said links and thereby articulate the first and second units, and mechanical linkage from said second link to said first split tapered die and from said third link to said second split tapered die, whereby actuation of said handle lever means will cause said second and third links to move toward one another and force the tapered dies toward one another out of their respective cavities.

3. An extensible articulated actuating device, comprising, first and second articulated actuation units, said first unit having a first and second link pivotally joined in end-to-end relationship, said second unit having a third and fourth link pivotally joined in end-to-end relationship, said first and second units laying in lateral substantially parallel relative position, an actuation lever carried by one of said links for driving the link in a direction to cause the unit with which it is carried to pivot and foreshorten, mechanical interconnection means between said first and second units transferring drive movement from the unit having the lever to the other unit, said interconnection means permitting longitudinal shifting of said first and second units with respect to one another while maintaining said interconnection, and power take-off means from one link of each unit at opposite ends of the respective units, whereby one unit may be carried with a first shiftable means and the other unit with a second shiftable means and the power take-off will provide actuation power for tooling carried thereby in substantially unchanged action regardless of position of the shiftable means.

4. A link actuating device, comprising, a first and second articulated unit each having two links joined in end-to-end relationship, a power take-off from one link of the first unit, a power take-off from one link of the second unit, said power take-off of one unit being at the end thereof opposite from the other unit, said first and second units positioned in lateral parallel relationship, means to flex both units simultaneously in the same direction to rotate the extreme ends thereof and foreshorten the overall length of said units, and means to longitudinally shift said units with respect to one another to thereby position said power take-off means at a selected distance apart.

5. A link actuating device, comprising, an articulated unit having two links joined in end-to-end relationship, a power take-off from one link, and means to flex said articulated unit to rotate the extreme ends thereof and foreshorten the overall length thereof.

No references cited.